United States Patent [19]

Van Patten

[11] Patent Number: 4,821,982
[45] Date of Patent: Apr. 18, 1989

[54] BRAIN $O_2$ RESERVE LIMITER FOR HIGH PERFORMANCE AIRCRAFT

[75] Inventor: Robert E. Van Patten, Bellbrook, Ohio

[73] Assignee: The United States of America as represented by the Secretary of the Air Force, Washington, D.C.

[21] Appl. No.: 35,425

[22] Filed: Apr. 7, 1987

[51] Int. Cl.$^4$ .............................................. B64C 13/16
[52] U.S. Cl. .................................. 244/76 R; 364/434
[58] Field of Search .................... 244/75 R, 76 R, 191, 244/182; 364/433, 434

[56] References Cited

U.S. PATENT DOCUMENTS

| | | | |
|---|---|---|---|
| 2,869,804 | 1/1959 | Muinch et al. | 364/434 |
| 2,949,260 | 8/1960 | Smith et al. | 244/191 |
| 3,780,723 | 12/1973 | Van Patten et al. | 128/1 A |
| 4,219,039 | 8/1980 | Jaggars | 137/38 |
| 4,243,024 | 1/1981 | Crosbie et al. | 128/1 A |
| 4,534,338 | 8/1985 | Crosbie et al. | 128/1 A |

Primary Examiner—Galen Barefoot
Assistant Examiner—Rodney Corl
Attorney, Agent, or Firm—Fredric L. Sinder; Donald J. Singer

[57] ABSTRACT

A method for controlling an aircraft to prevent high G-caused pilot unconsciousness. Data defining a state space of acceleration, rate of change of acceleration and duration of acceleration at maximum acceleration within which an aircraft may be operated without causing pilot unconsciousness is provided to an aircraft intelligent flight control system. The flight control system continuously monitors the past and present state of the aircraft and compares to the surface boundaries of the defined safe state space. Whenever the aircraft exceeds those boundaries, the flight control system intervenes to unload the aircraft to within those boundaries. Additional data and measurements may be added to define an n-dimensional state space. Another embodiment unloads the aircraft to a baseline acceleration. A simplified embodiment is described which compares current acceleration to a preselected value of acceleration. If the current acceleration exceeds the preselected value, the previous acceleration onset rate is compared to a preselected acceleration onset rate. If it exceeds the preselected onset rate, the duration of time the current and immediately past acceleration has exceeded the preselected value of acceleration is determined. If that value is greater than a preselected duration, the flight control system commands the aircraft to perform an unloading maneuver to reduce the G loading on the aircraft to a preselected baseline acceleration.

4 Claims, 3 Drawing Sheets

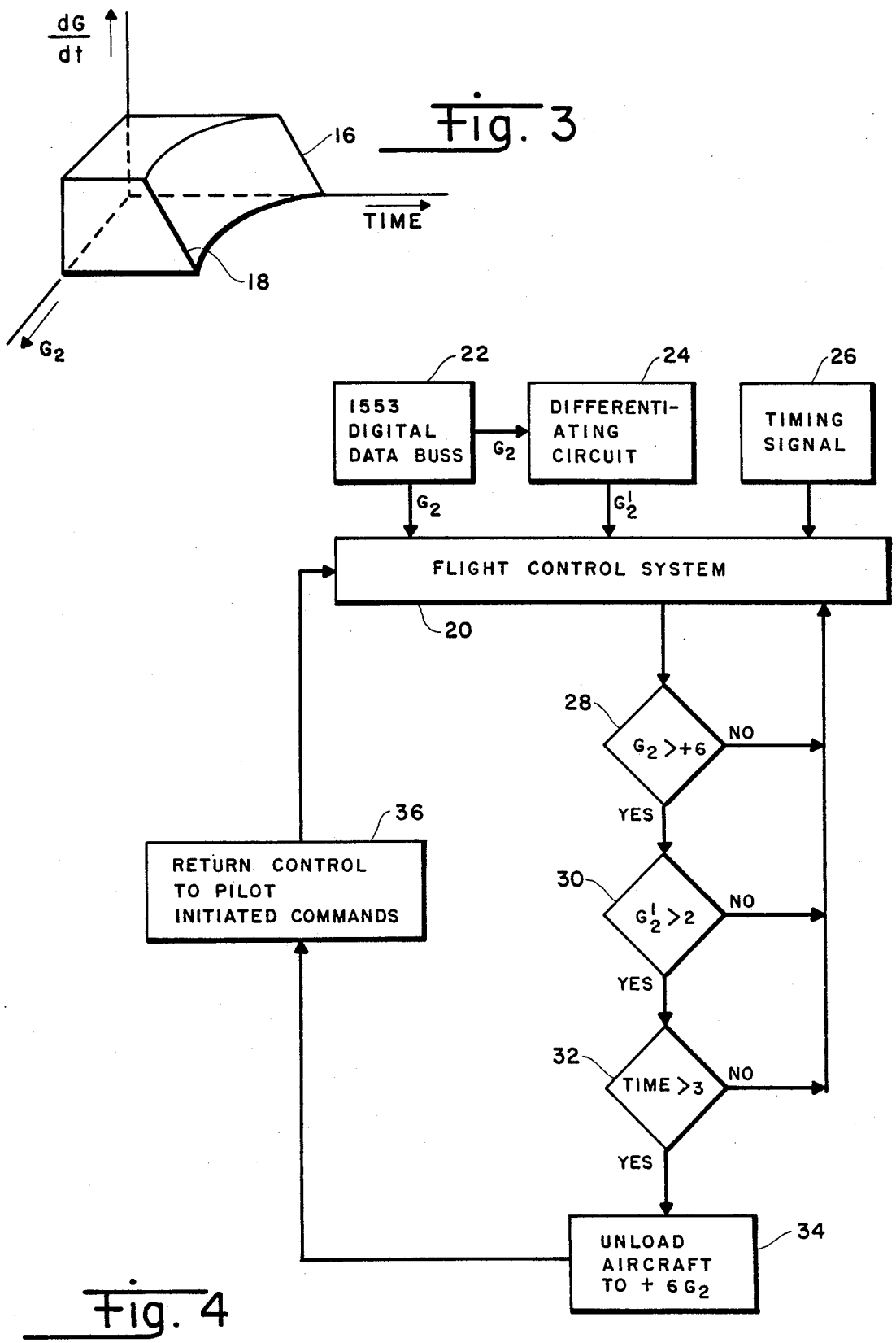

BRAIN O₂ RESERVE LIMITER FOR HIGH PERFORMANCE AIRCRAFT

RIGHTS OF THE GOVERNMENT

The invention described herein may be manufactured and used by or for the Government of the United States for all governmental purposes without the payment of any royalty.

BACKGROUND OF THE INVENTION

The present invention relates generally to methods and apparatus for increasing the ability of pilots of high performance aircraft to resist high G caused unconsciousness, and more specifically to a novel method for controlling the aircraft to prevent high G caused unconsciousness.

While flying simulated or actual combat maneuvers, a fighter pilot's body undergoes very high accelerations from the rapid changes in speed and direction. These accelerations are generally expressed in units of G, equal to the acceleration of a mass at the surface of the Earth due to gravity. The accelerations of greatest concern to a pilot are those that occur along the vertical z-axis of the cockpit when the pilot pulls back hard on the aircraft control stick to accomplish a rapid climb or a fast banked turn. The pilot's oxygen-carrying blood is forced away from its regular path between the heart-lungs and the brain, and pools toward the blood vessels of his lower extremities. At sufficiently high G's, the pilot's field of vision narrows as blood flow to the retinas is reduced, or grayout, followed by blackout, and finally followed by loss of consciousness from insufficient blood flow to the brain.

Pilots fight the effects of high G's by straining maneuvers, tensing the muscles of their torso and extremities to squeeze shut the blood vessels and force blood flow to continue in the upper parts of their body. An anti-G suit helps this process by covering the pilot's legs and torso with air bladders which are automatically inflated during high acceleration maneuvers to compress the blood vessels in those regions and force blood flow to continue to the brain. Because continuous compression of the blood vessels of the lower extremities is harmful, anti-G suits include an anti-G valve to restrict inflation only to periods of high acceleration.

Modern high performance jet fighters, such as an F-16, increasingly incorporate computer controlled intelligent flight control, or fly-by-wire, systems. In an F-16, the pilot indicates through control stick movement a request for a maximum rate maneuver and the flight control system computer determines and commands the appropriate response. The flight control computer limits the severity of its commands to restrict the maximum G loading on the aircraft. Generally, the maximum permitted G loading is well beneath the capabilities of the airframe and is intended to restrain the G loadings to levels that an experienced pilot can tolerate. This computer controlled limiting of maximum G loadings has not been completely successful in protecting pilots from blackouts. The nearly instantaneous response of a high performance aircraft causes acceleration onset rates(($dG/dt$ or $G'$) greater than the response time of typical anti-G suit valves, leaving the pilot both unprotected for periods of time sufficient to cause unconsciousness, and causing unconsciousness due to a high onset rate of acceleration at G levels lower than the pilot could otherwise tolerate.

The prior art has attempted to solve these problems primarily by improvements in anti-G valves to improve response times. See, for example, U.S. Pat. No. 3,780,723 to the present inventor, co-pending application No. 831,901 to the present inventor U.S. Pat. Nos. 4,243,024 to Crosbie et al, and 4,336,590 to Jacq et al.

The present emphasis on fast response anti-G valves, while valuable in solving the dangers of high onset rate acceleration, has largely ignored the ability of pilots to tolerate for short periods much higher G-levels than flight controls presently permit. Current high performance aircraft are capable of maneuvering at accelerations of 9 G. The perceived limits of maximum permissible acceleration on pilots using current anti-G equipment and seat configurations is approximately 7 G, which defines the outmost boundary of performance permitted by present fly-by-wire systems. Experiments show that pilots can tolerate accelerations over 8 G if limited in duration to less than 3 seconds. It is seen, therefore that the operational performance of these aircraft is capable of being enhanced by a ratio of 9:7, or almost 29%.

It is, therefore, a principal object of the present invention to provide a significant extension of the usable flight envelope of a fighter aircraft without danger of causing a sudden G-induced loss of pilot consciousness.

SUMMARY OF THE INVENTION

The present invention provides a method of protecting a pilot from G-induced unconsciousness. The unique discovery of the present invention is that substantial improvement in the safe performance envelope of fighter aircraft may be achieved by having an aircraft intelligent flight control system adaptively take into account the actual physiological limitations of the pilot in controlling the maximum acceleration of the aircraft.

Accordingly, the present invention is directed to a method of protecting a pilot from G-induced unconsciousness. Data defining a state space comprising acceleration, rate of change of acceleration and duration of acceleration is provided to, for example, an aircraft flight control system. The state space defines boundaries of previously determined pilot G tolerance. The flight control system continuously monitors the present and past acceleration and rate of change of acceleration of the aircraft. Whenever the monitored accelerations and durations exceed the boundaries of the defined state space, the flight control system directs the aircraft to perform an unloading maneuver to reduce the monitored acceleration and rate of change of acceleration to values within those boundaries.

The invention additionally includes directing a maneuver unloading the aircraft to a preselected baseline acceleration whenever the boundaries of the state space are exceeded.

The invention also includes first testing whether a current value of acceleration exceeds a preselected value. If true, then testing whether the current acceleration was reached by exceeding a preselected value of rate of change of acceleration. If that test is true, then finally testing whether the duration of the current acceleration exceeds a preselected duration. If all three tests are true, then the aircraft is commanded to perform an unloading maneuver to reduce its acceleration to a baseline value, followed by return of control of the aircraft to the pilot.

DESCRIPTION OF THE DRAWINGS

The present invention will be more clearly understood from a reading of the following detailed description in conjunction with the accompanying drawings wherein:

FIG. 3 is a graph of a three-dimensional state space of acceleration, acceleration onset rate, and duration of acceleration at maximum acceleration within which an aircraft may be operated without causing pilot unconsciousness; and, FIG. 4 is a flow diagram of an example embodiment of applicant's method for controlling an aircraft to provide a maximum maneuvering envelope without causing pilot unconsciousness.

DETAILED DESCRIPTION

Figure 1:
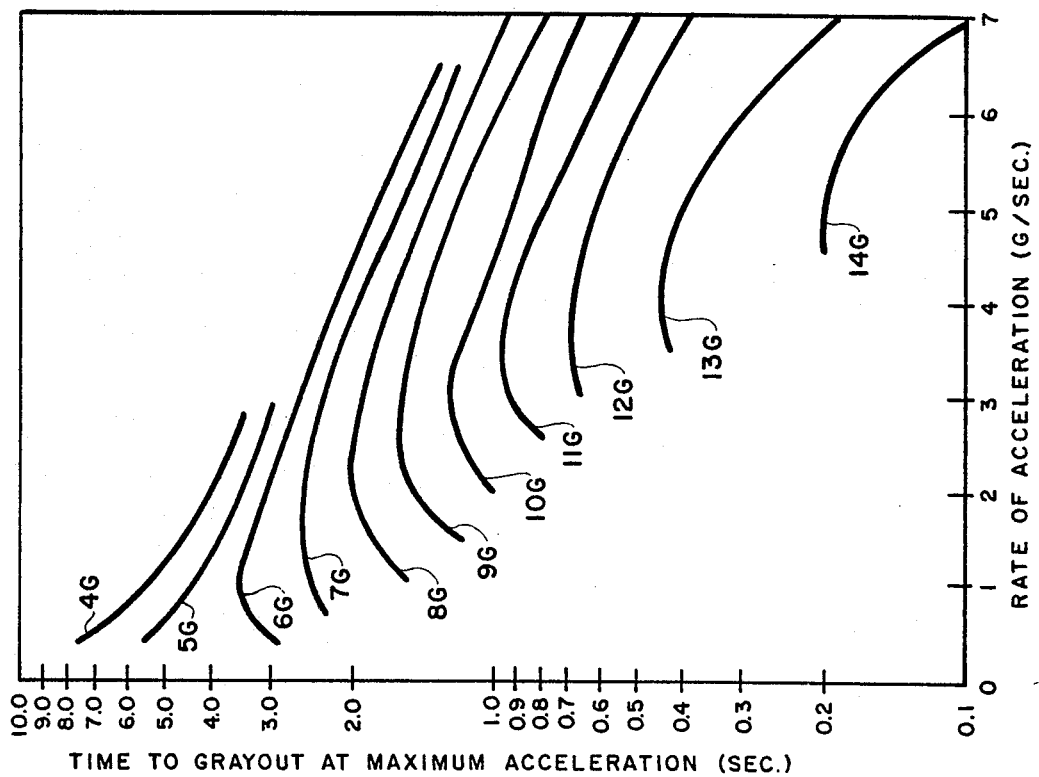
FIG. 1 is a graph of time to grayout vs. acceleration onset rate for a range of maximum accelerations.

Referring now to FIG. 1 of the drawings, there is shown a graph of time to grayout vs. acceleration onset rate for a range of maximum accelerations. The data for this graph was taken from the work of A. B. Stoll on an U.S. Navy centrifuge with a large number of relaxed (not performing straining maneuvers) and unprotected (not wearing anti-G suits) subjects. The vertical axis is a logarithmic scale of time to grayout from 0.1 second at the intersection with the horizontal axis to 10 seconds at the top of the graph. Time to grayout is measured from when a maximum G level was reached and held, after rising at the shown onset rate, until grayout occurred.

Figure 2:
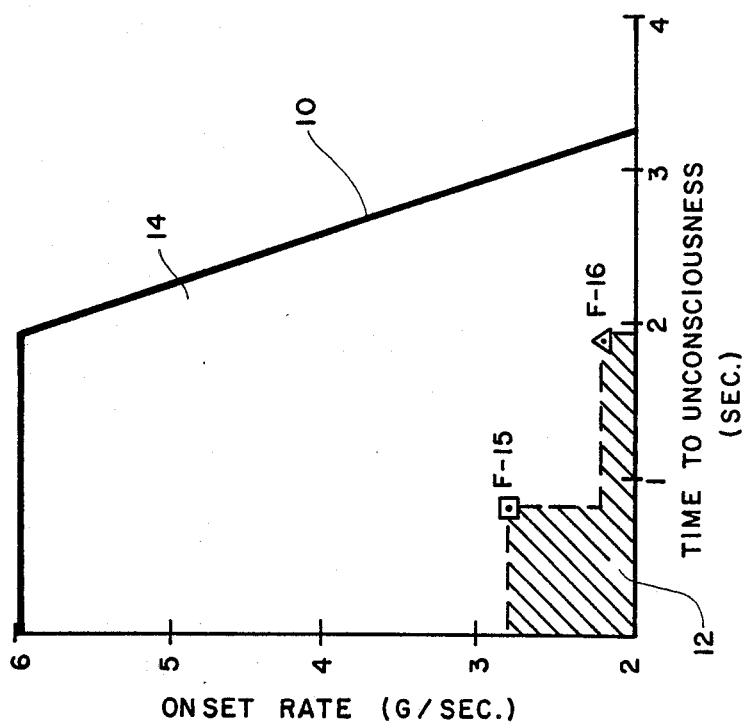
FIG. 2 is a graph of time to unconsciousness vs. acceleration onset rate for an 8 G maximum acceleration.

FIG. 2 is a graph of time to unconsciousness vs. acceleration onset rate for an 8 G maximum acceleration. The data for this graph was taken from the 8 G line of the graph of FIG. 1 and adding to the time to grayout the shortest time, observed during the FIG. 1 graph tests, to unconsciousness once grayout was reached. Line 10 represents, therefore, the safe boundary for a combination acceleration onset rate and duration of a maximum 8 G acceleration on a relaxed and unprotected pilot. The hatched area 12 shows the present limits, from telemetered data from an air combat maneuvering range instrumentation system, to which the F-16 and the F-15 are being flown in combat exercises. The area 14 between area 12 and line 10 represents the unexploited region of F-16 and F-15 performance at 8 G's.

FIG. 3 is a partial graph of a three-dimensional state space of acceleration, acceleration onset rate, and duration of acceleration at maximum acceleration within which an aircraft may be operated without causing pilot unconsciousness. Line 16 represents the +6 Gz level of acceleration and line 18 the +9 Gz level. The graph of FIG. 2 is a slice through this space at 8 G. Should the pilot attempt to maintain a maneuver beyond the boundary established for that point, the flight control system will intervene and command an unloading maneuver to reduce the G loading on the aircraft down a baseline value. With current protective equipment, the maximum acceleration for baseline will probably be about +6 Gz, the G level that can be safely tolerated by an experienced pilot with modest effort.

The precise shape of the three dimensional state space can be determined from additional centrifuge experimentation. Additional experimentation can also add additional information such as the frequency with which a pilot, having once been outside the boundaries of the defined state space and removed by the flight control system, can repeat the maneuver. The simple duration at maximum acceleration may be replaced with more accurate durations of continuously varying accelerations and onset rates measured from different starting points. Such additional information will add additional dimensions to the state space to become an n-dimension state space. While an n-dimensional state space is difficult to present in a graphical view, it is mathematically straightforward in a computer program algorithm.

FIG. 4 is a simplified flow diagram of example embodiment of applicant's method of controlling an aircraft to provide a maximum safe maneuvering envelope. The portion of the flight control system 20 which includes the software incorporating applicant's method receives a continuous input of the various load aircraft load factors from the aircraft 1553 digital data bus 22, particularly the acceleration of the aircraft in the vertical z-axis, Gz. The value of Gz is also input to a differentiating circuit 24 to provide an input to flight control system 20 of the rate of change, or onset rate, of acceleration, Gz'. A timing signal 26 is also input to flight control system 20, or may already be available as part of other programs which comprise flight control system 20.

Flight control system 20 is provided with preselected values for acceleration, rate of change of acceleration, duration of acceleration above maximum acceleration and baseline acceleration previously determined to protect the pilot from unconsciousness. In this particular embodiment, the preselected value of acceleration is +6 Gz, the preselected value of rate of change of acceleration is +2 G/second, the preselected duration at maximum acceleration is 3 seconds and the baseline acceleration is +6 Gz.

During flight, flight control system 20 continuously performs test 28 to determine if the current acceleration is above the preselected +6 Gz. If false, flight control system continues to perform its other programs without interruption. If the preselected +6 Gz has been exceeded, test 30 is performed to determine if the acceleration onset rate to the current acceleration exceeded 2 Gz'. If true, a last test 32 is performed to determine if the acceleration has exceeded +6 Gz for more than the preselected 3 seconds. If all three tests 28, 30 and 32 are true, flight control system 20 commands the aircraft to perform a maneuver 34 to reduce the acceleration to a baseline acceleration of +6 Gz, then to return control 36 to pilot initiated commands.

The simple method of FIG. 4 may be improved by the use of a more sophisticated algorithm that, instead of abruptly unloading the aircraft once a preselected set of parameters have been exceeded, finely controls the acceleration of the aircraft to stay within the boundaries, or on the surface, of a defined state space. The algorithm may be further improved by expanding it to respond to the previously discussed n-dimensional state space. The added complexity required to add these improvements, while not trivial, will be easily within the skill of those with experience in flight control systems.

The disclosed method of extending the usable flight envelope of a fighter aircraft successfully demonstrates, as an alternative to attempts to increase a fighter pilot's physical tolerance to acceleration, increasing the use of the fighter pilot's existing tolerance by using the computing capabilities of a flight control system to adaptively match the maximum allowed performance of the aircraft as closely as possible to the actual physiological limitations of the pilot. Though the disclosed use is specialized, it will find application in other areas of interaction between man and machine by teaching the substantial advantages in performance available by a closer matching of the performance characteristics of the machine to the surface of an n-dimensional state space describing the relevant physiological limitations of the man.

It is understood that certain modifications to the invention as described may be made, as might occur to one with skill in the field of the invention, within the intended scope of the claims. Therefore, all embodiments contemplated have not been shown in complete detail. Other embodiments may be developed without departing from the spirit of the invention or from the scope of the claims.

I claim:

1. A method of protecting a pilot from G-induced unconsciousness while piloting an aircraft, comprising the steps of:
   (a) providing previously determined data defining a state space comprising acceleration, rate of change of acceleration and duration of acceleration of the aircraft, the state space having previously been determined to be acceptable boundaries of G tolerance for the pilot;
   (b) continuously monitoring over time the acceleration and rate of change of acceleration of the aircraft; and,
   (c) comparing the monitored values of acceleration and rate of change of acceleration to said state space and, whenever the boundaries of said state space are exceeded directing the aircraft to perform a maneuver unloading the aircraft to reduce the monitored acceleration and rate of change of acceleration to values within said boundaries.

2. A method of protecting a pilot from G-induced unconsciousness while piloting an aircraft, comprising the steps of:
   (a) providing previously determined data defining a state space comprising acceleration, rate of change of acceleration and duration of acceleration, the state space having previously been determined to be acceptable boundaries of G tolerance for the pilot;
   (b) providing a preselected baseline acceleration within the boundaries of said state space;
   (c) continuously monitoring over time the acceleration and rate of change of acceleration of the aircraft; and,
   (d) comparing the monitored values of acceleration and rate of change of acceleration to said state space and directing the aircraft to perform a maneuver unloading the aircraft to the preselected baseline acceleration whenever the boundaries of said state space are exceeded.

3. A method of protecting a pilot from G-induced unconsciousness while piloting an aircraft, comprising the steps of:
   (a) providing preselected values of acceleration, rate of change of acceleration, duration of acceleration above the preselected value of acceleration, and baseline acceleration;
   (b) continuously monitoring current values of acceleration and rate of change of acceleration of the aircraft in the vertical z-axis;
   (c) storing past values of said acceleration and said rate of change of acceleration for preselected periods of time; and,
   (d) whenever the current value of acceleration exceeds said preselected value of acceleration; one or more of said past values of rate of change of acceleration exceeds said preselected rate of change of acceleration; and, the duration of the current value of acceleration exceeding said preselected value of acceleration is greater than said preselected duration, commanding the aircraft to perform a maneuver to unload the aircraft to reduce the acceleration of the aircraft to said baseline value of acceleration, then returning control of the aircraft to the pilot.

4. The method of protecting a pilot from G-induced unconsciousness according to claim 3, wherein the preselected value of acceleration is +6 G in the z-axis. the preselected value of rate of change of acceleration is +2 G/second, the preselected duration above the preselected value of acceleration is 3 seconds, and the value of the baseline acceleration is +6 G in the z-axis.

* * * * *

UNITED STATES PATENT AND TRADEMARK OFFICE
CERTIFICATE OF CORRECTION

PATENT NO. : 4,821,982

DATED : April 18, 1989

INVENTOR(S) : Robert E. Van Patten

It is certified that error appears in the above-identified patent and that said Letters Patent is hereby corrected as shown below:

Column 3, line 59, after "down", insert --to either within the defined state space or, more simply, to--.

Column 4, line 12, after "of", insert --a second--.

Column 5, claim 1, line 16, after "exceeded", insert a comma --,--.

Signed and Sealed this

Twelfth Day of June, 1990

Attest:

HARRY F. MANBECK, JR.

Attesting Officer

Commissioner of Patents and Trademarks